Figure 1:
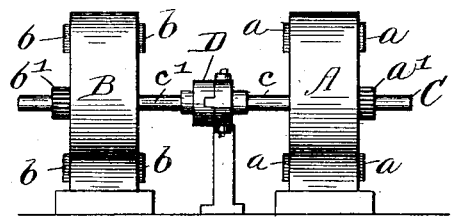

No. 743,601. PATENTED NOV. 10, 1903.
A. P. WARNER.
MEANS FOR CONTROLLING THE SPEED OF ELECTRIC MOTORS.
APPLICATION FILED MAR. 20, 1903.
NO MODEL. 2 SHEETS—SHEET 1.

Witnesses:
Harry P. White
Ray White

Inventor:
Arthur P. Warner
By Howard M. Cox Atty.

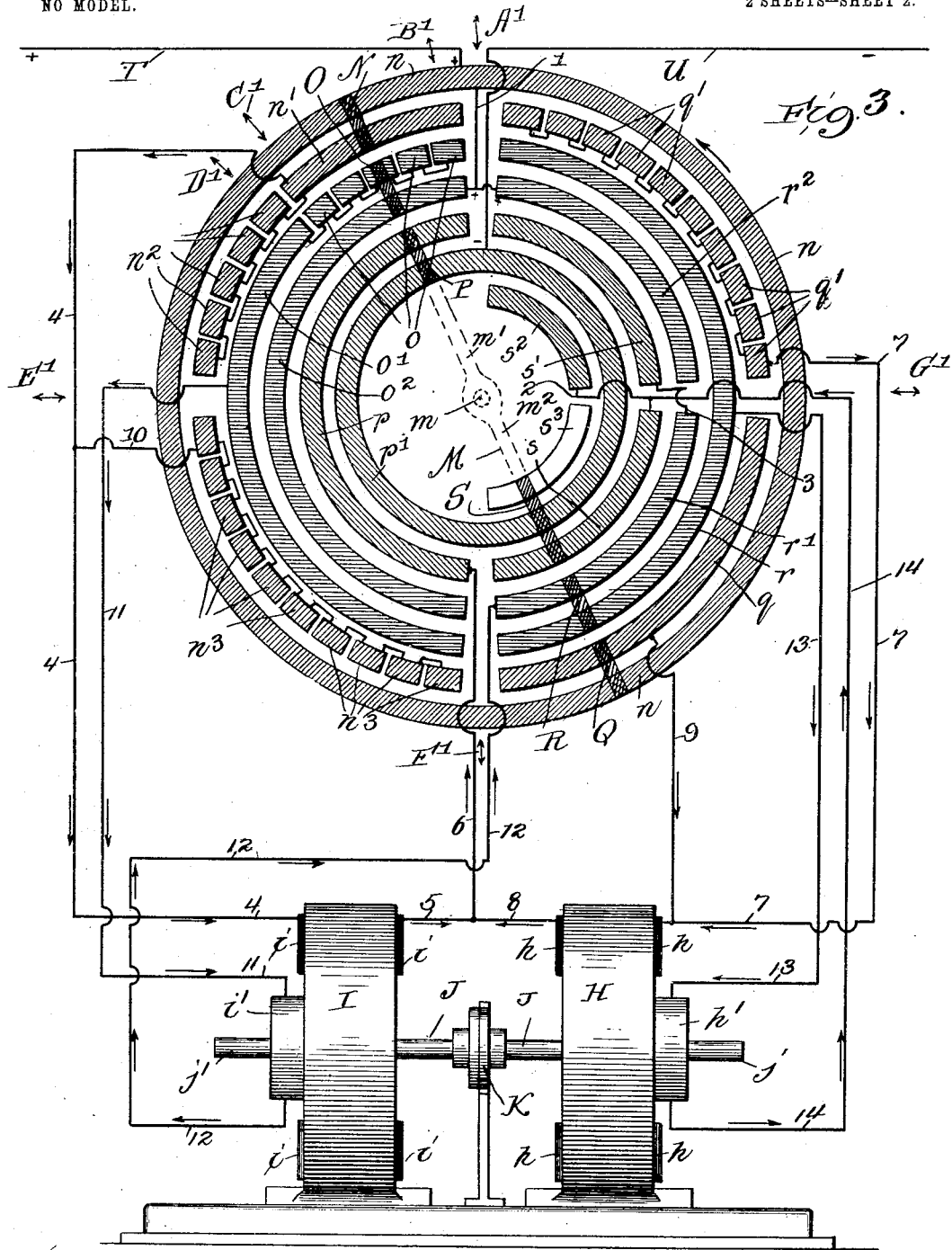

No. 743,601. Patented November 10, 1903.

UNITED STATES PATENT OFFICE.

ARTHUR P. WARNER, OF CHICAGO, ILLINOIS.

MEANS FOR CONTROLLING THE SPEED OF ELECTRIC MOTORS.

SPECIFICATION forming part of Letters Patent No. 743,601, dated November 10, 1903.

Application filed March 20, 1903. Serial No. 148,668. (No model.)

*To all whom it may concern:*

Be it known that I, ARTHUR P. WARNER, a citizen of the United States, residing in the city of Chicago, county of Cook, and State of Illinois, have invented a new and useful Improvement in Means for Controlling the Speed of Electric Motors, of which the following is a specification.

My invention relates to electric motors mechanically connected together in sets in such manner that the armatures revolve at the same relative speed. The fields may be either separate, shunt, or compound wound.

The objects of the invention are, first, to provide means for producing a wide variation in the speed of the motors; second, to provide a method for producing great starting torque with a small amount of current; third, to provide a system whereby two or more motors may be changed from a series to a parallel connection without the introduction of resistance in the armature circuit at the moment when such change of connection is made. I attain these objects by the mechanism and arrangement of devices which may be briefly outlined as follows: The armatures of two or more motors are mechanically connected together so as to run either at the same speed or at speeds whose ratios are constant. This may be done by mounting the armatures on the same shaft or by connecting the armatures by belting or other gearing. The armatures are electrically connected in series in the main circuit and the fields in parallel therein.
When it is desired to increase the speed after the motors are started, resistance is inserted in the field-circuit of one of the motors, which lowers the counter electromotive force produced in that machine. This of course reduces the resistance of the armature, and consequently increases the potential difference in the second armature, which in turn increases the speed. The weakening of the field may be continued until there is no counter electromotive force generated in the first armature and the machine becomes dead, while the full difference of potential is on the second armature. Under this condition the machines run at full speed; but work is being done by only one of them.

In case the two machines are of the same voltage and it is desired that both shall act the armature of the first machine is disconnected from the line and the fields thereof brought up to the maximum strength. The armatures are then connected in parallel, and the power of both motors may be utilized. These results are obtained by the mechanism illustrated in the accompanying drawings, in which—

Figure 2:
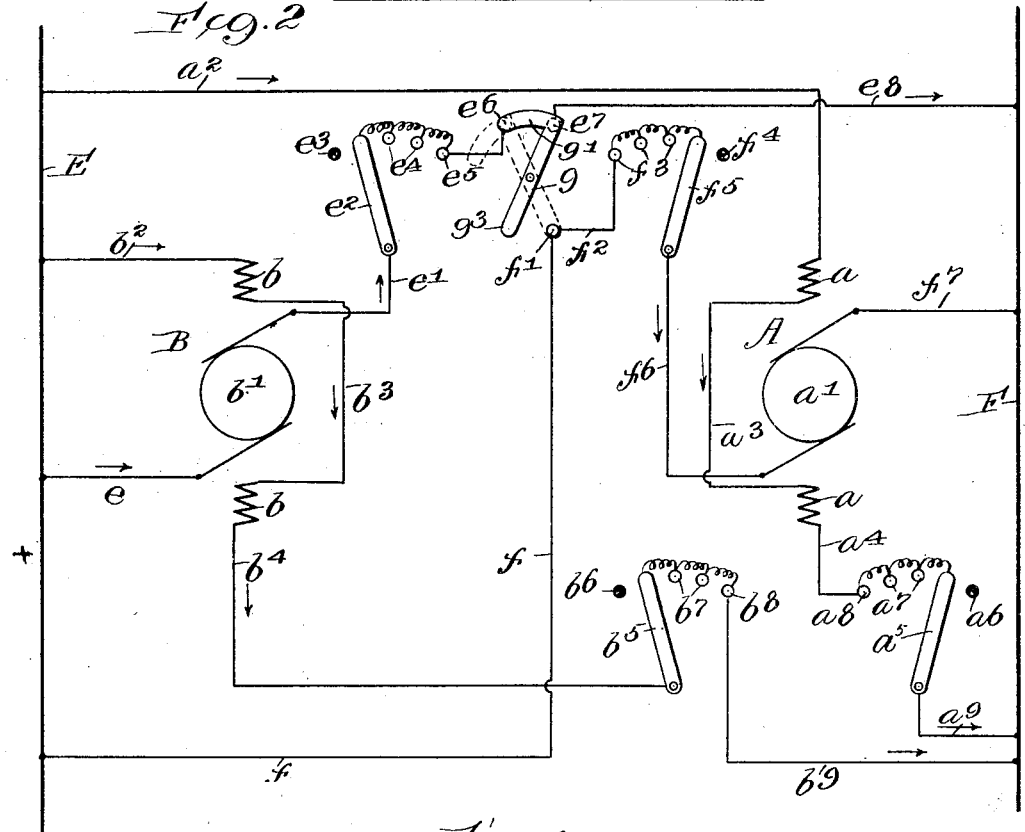
Figure 4:
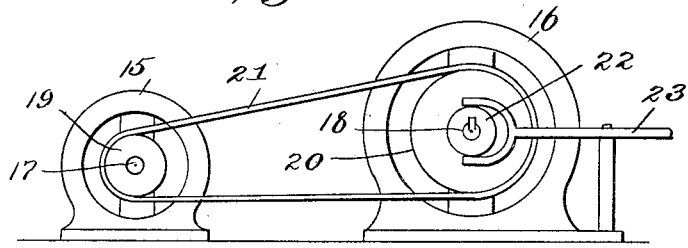

Figure 1 is an end view in elevation, showing the preferred manner of mechanical connection wherein the motor-armatures are on the same shaft. Fig. 2 is a view showing the electric connections in a diagrammatic form. Fig. 3 is a view, partially diagrammatic, showing the preferred form of controller and connections therefrom to the main line and to the motors; and Fig. 4 is a side view in elevation, showing two motor-armatures connected by means of a belt.

Similar reference characters denote similar parts throughout the several views.

A and B represent two motors, $a\,a$ and $b\,b$ the fields, and $a'\,b'$ the armatures thereof, respectively. Said armatures are mounted on the shaft C, which is preferably formed in two parts $c\,c'$, connected by means of the clutch D.

Referring to the diagrammatic form of connections, Fig. 2, E F are the main lines, through which current is supplied at constant potential from a source of electric energy. The armature $b'$ is connected to the line E by means of the conductor $e$ and is connected to the switch-arm $e^2$ by means of the conductor $e'$. The contact $e^3$ for said arm is insulated, so that the armature-circuit may be broken. The contacts $e^4$ are connected together through resistance-coils, and the last contact $e^5$ is connected substantially without intervening resistance to the contact $e^6$. The contact $e^7$ is insulated from the contact $e^6$, but is connected to the line F by means of the conductor $e^8$.

The conductor $f$ connects the line E to the contact $f'$, and the conductor $f^2$ connects the contact $f'$ to the contacts $f^3$, which latter have resistance-coils intervening between them. The switch-arm $f^5$ is adapted to meet said contacts $f^3$ and the insulated contact $f^4$, whereby the armature-circuit of motor A may be broken. The conductors $f^6$ and $f^7$ connect the armature $a'$ to the switch-arm $f^5$ and main line F, respectively.

The switch-arm $g$ is adapted to connect the contact $e^6$ to the contact $f'$, but is also provided with a conductor-bar $g'$, which forms a short connection between the contacts $e^6$ and $e^7$ when said switch-arm is out of touch with the contact $f'$.

The fields $b$ are connected together through the conductor $b^3$ and are connected to the main line E and switch-arm $b^5$ through the conductors $b^2$ and $b^4$, respectively.

$b^7$ represents contacts for the switch-arm $b^5$ and have resistance-coils between them, the last contact $b^8$ having a short connection to the main line F through the conductor $b^9$. The contact $b^6$ is insulated and serves to break the circuit through the fields $b$. In a similar manner the fields $a$ are connected together through the conductor $a^3$ and are connected to the main line E and switch-arm $a^5$ through the conductors $a^2$ and $a^4$, respectively.

$a^7$ represents contacts for the switch-arm $a^5$ and have resistance-coils between them, the last contact $a^8$ having a short connection to the main line F through the conductor $a^9$. The contact $a^6$ is insulated and serves to break the circuit through the fields $a$. It is thus apparent that the fields $a$ and $b$ are connected in parallel across the main lines E and F, and the armatures $a'$ and $b'$ are connected in series when the switch-arm $g$ connects the contacts $e^6$ and $f'$; but said armatures are connected in parallel across the main lines E and F when the switch $g$ is open, and through its bar $g'$ connects the contacts $e^6$ and $e^7$.

The method of operation is as follows: In starting both fields are given full strength and the switch $g$ is closed, so as to connect the contacts $e^6$ and $f'$, thereby breaking the connection between the contacts $e^6$ and $e^7$ and throwing the armatures in series. At first switches $e^2$ and $f^3$ are set to introduce rheostat resistance in the armature-circuit; but as speed is attained counter electromotive force is generated in the armatures, and the rheostat resistance is cut out. Under this condition, with the fields full strength, if the machines are both alike the speed will be one-half and the torque double what it would be if the armatures were connected in parallel. To increase the speed, resistance is inserted in the field-circuit of one of the motors. This lowers the counter electromotive force generated in that machine, and consequently lowers the armature resistance thereof, with the result that the armature of the other machine receives a greater proportion of the drop of potential across the main lines, which in turn increases the speed. This weakening of the field may be continued until there is no counter electromotive force in the first armature, and therefore the full difference of potential is on the second armature. Under these conditions the machines run at maximum speed; but the first machine performs no work.

Suppose that in the case of two differently-wound machines of the same type armature $b'$ runs at a speed of five hundred revolutions per minute at two hundred and fifty volts and armature $a'$ has a capacity which allows the same amount of current to flow, but produces a counter electromotive force of one thousand volts. When the two armatures are in series and the fields have their maximum strength, the speed will be only one-fifth of the five hundred revolutions per minute or one hundred revolutions per minute, for it is well known that the counter electromotive force produced in an armature depends on and varies directly with the voltage of the driving-current, provided the field strength remains the same. If the field strength of the one-thousand-volt machine is now gradually reduced, the speed of the two armatures will be correspondingly increased until the maximum speed of five hundred revolutions per minute is obtained.

When the field strength of the one-thousand-volt machine A is reduced to zero, the machine becomes dead and may be cut out. To effect this, the switch-arm $g$ is thrown so as to disconnect the contacts $e^6$ and $f'$ and at the same time connect the contacts $e^6$ and $e^7$. If after motor A has been thus cut out it is desired to increase the torque, the switch-arm $a^5$ is thrown to contact $a^8$ and the fields $a$ given full strength. Armature $a'$ is then connected separately with the main lines E and F, bringing the two armatures in parallel, and thus obtaining the combined work of both machines. Inasmuch as both machines are running at the time it is not necessary to introduce rheostat resistance in the armature-circuit during the time when the machines are being brought into parallel across the main lines. To increase the speed and at the same time utilize both machines, the fields are gradually weakened as much as desired.

It is evident in the case of the two-hundred-and-fifty and the one-thousand volt machines above illustrated that with the armatures connected in series field strength maximum and consequent speed of one hundred revolutions per minute the torque will be five times as great as when with the same amount of current flowing the maximum speed of five hundred revolutions per minute is attained. In a similar manner, in case two machines of the same voltage are used, when the second armature has reached its maximum speed and the first armature is dead the first armature may be disconnected from the main lines and the fields of this machine again brought up to the maximum point. The armatures may then be connected in parallel and the power of both motors utilized. The great advantage of this system in street-railway or other traction work or in elevator or printing-press work, where great starting torque is required, is readily apparent.

If desired, clutch D may be released, so as to break the mechanical connection between the two armatures at the time when the field of one machine has been reduced to zero and the work is being done by the second machine. This would permit the dead machine to remain still instead of running idle.

I will now describe the preferred form of controller shown in Fig. 3, wherein H and I represent two motors, $h$ $h$ and $i$ $i$ the fields, and $h'$ and $i'$ the armatures thereof, respectively. The armatures are mounted on the shaft J, which is preferably formed in two parts $j$ and $j'$, connected by means of the clutch K. M is the controller-arm, which is pivoted at the point $m$ and extends in both directions therefrom. The portion of the controller-arm $m'$ lying on one side of the pivot $m$ carries the brushes N O P, and the portion of said arm $m^2$ lying on the other side of said pivot $m$ carries brushes Q R S. The brush N is adapted to electrically connect the conductor-segment $n$ with the segments $n'$ $n^2$ $n^3$, adjacent thereto. Said segment $n$ forms a complete circle and is electrically connected to the source of electromotive force by means of the main conductor T.

The different electrical conditions under which the motors are to work depend upon the rotated position of the controller-arm M, and to facilitate description let it be supposed that there are seven critical stations in the total controller circumference, which stations are represented by the letters A' B' C' D' E' F' G'. It is not necessary that the controller-circle extend throughout a complete circumference nor that the critical points or stations subtend any definite number of angular degrees; but for convenience the present controller is constructed so that stations A', E', F', and G' are ninety degrees apart and occur in the order given, proceeding in an anticlockwise direction. Station B' is adjacent to station A' and stations C' and D' occur in the order given between stations A' and E'. Said stations C' and D' are adjacent to each other and by preference are located approximately midway between stations A' and E'.

Segment $n'$ above mentioned extends from station B' to C' and is electrically connected to segment $n$ when the brush N is at any point between stations A' and C'.

The short segments $n^2$ are series connected through resistances and occupy the angular space between stations D' and E'. Segment $n'$ is also connected through resistance to the nearest one of said segments $n^2$, and therefore the amount of resistance interposed between the brush N and segment $n'$ increases as said brush moves in an anticlockwise direction away from the segment $n'$.

The short segments $n^3$ are series connected through resistances and occupy the angular space between the stations E' and F'. The segments $o$ and $o'$ lie at the same radial distance from the pivotal point $n$. The segments $o$ extend between stations B' and C', while the segment $o'$ extends from the station D' to station F'. Said segments $o$ and $o'$ are series connected through suitable resistances. The segment $o^2$, which is radially next adjacent to the segments $o$ and $o'$, is adapted to be electrically connected therewith through the brush O. Said segment $o$ occupies nearly a semicircumference, extending from B' to F'.

The segments $p$ and $p'$ are adapted to be electrically connected through the brush P. Said segment $p$ occupies nearly a semicircumference, extending from the station B' to station F', while segment $p'$ is continuous throughout the entire circumference of the controller. The brush Q is adapted to electrically connect the segment $n$ with the radially adjacent segment $q$. Said segment $q$ extends nearly a quarter-circumference and lies between the stations F' and G'. The short segments $q'$ are electrically connected together in series through suitable resistances and lie in the fourth quarter of the controller, occupying nearly a quarter-circumference between stations G' and A'. Said segments $q'$ are adapted to be connected to segment $n$ through the brush Q. The segment $r$ lies in the third and fourth quarters of the controller extending nearly a semicircle between stations F' and A'. The segment $r'$ is adapted to be connected to said segment $r$ through the brush R and lies in the third quarter of the controller, extending nearly a quarter-circumference between the stations F' and G'. The segment $r^2$ is adapted to be connected to said segment $r$ through the brush R and lies in the fourth quarter of the controller, extending nearly a quarter-circumference between the stations G' and A'.

The segment $s$ is adapted to be connected with the segment $p'$ through the brush S and lies in the third quarter, extending nearly a quarter-circumference between the stations F' and G'. The segment $s'$ lies at the same radial distance from the pivot $m$ as does segment $s$ and is adapted to be connected to the segment $p'$ through the brush S. Said segment $s'$ lies in the third quarter of the controller, extending nearly a quarter-circumference between the stations G' and A'. The segment $s^2$ lies in the fourth quarter of the controller and occupies nearly a quarter-circumference between the stations G' and A'. The segments $s^2$ and $s^3$ are at equal distances from the pivot $m$, segment $s^3$ lying in the third quarter of the controller and occupying nearly a quarter-circumference between the stations F' and G'. Segment $s^3$ is completely insulated and merely serves as a rest to temporarily support one portion of the brush S. Said brush S is of sufficient length to connect the segment $p'$ with both the segments next adjacent inside and next adjacent outside.

The electric connections are as follows: The conductor T leads from one pole of the source of electromotive force and is connected to the segment $n$. The conductor U leads from the other pole of the electromotive force and is connected to the segment $p'$. For convenience line T will be referred to as a "positive" line and line U will be referred to as a "negative" line. Segments $n$, $o^2$, and $r^2$ are connected by means of the conductor 1. Segments $s^2$ and $s$ are electrically connected together by means of a conductor 2.

Segments $s$ and $s^2$ are permanently connected by means of the conductor 2 and segments $r'$ and $s'$ are similarly connected by means of the conductor 3. The fields of motor I are connected to segment $n$ through the conductor 4 and to segment $p$ through conductors 5 and 6. The fields of motor H are connected to the series of segments $q'$ near station G' through conductor 7, and to segment $p$ through conductors 8 and 6, and to segment $q$ through conductor 9. The fields are therefore connected in the main circuit in parallel when the controller-arm portions $m'$ and $m^2$ are in the first and third quarters, respectively, of the controller. The first of segments $n^3$ at station E' is connected to the fields of motor I through conductors 10 and 4.

The armature $i'$ is connected to segment $o'$ through conductor 11 and to segment $r'$ through conductor 12. The armature $h'$ is connected to segment $r$ through conductors 13 and to segments $s$ and $s^2$ through conductors 14 and 2.

In operation the controller-arm M rotates through a semicircumference only, the arm portion $m'$ traveling between station A' and station F' through the station E'. The portion $m^2$ travels between the station F' and A' through the station G', and the parts are so arranged that when the controller M is at station A' all electrical connections with the source of energy are broken. Now considering the field-circuit, when the controller is moved to station D' the brush N connects the segments $n$ and $n'$ and the brush P connects the segments $p$ and $p'$, so that the fields are in parallel with the source of electromotive force. Moving the controller parts $m'$ from station B' to station C' has no effect upon the field-circuits; but as the brush N moves from station C' to E' the resistances between segments $n^2$ and $n'$ come gradually into circuit, thereby weakening the field strength of motor I. When the station E' is reached, the circuit of the fields $i$ is completely broken and the motor I becomes dead. The maximum speed of the armature $h'$ is thus reached. During the time when the controller-arm is in the first quarter between stations A' and E' the armatures are in series, being connected through the brushes O, R, and S; but at station B' the segment $o$ interposes starting resistance in the armature-circuit. This starting resistance is gradually reduced as the controller-arm is moved, and after the point D' is reached the interposed resistance is all cut out and the full current flows in series through the armatures.

The slight rotation of the controller from station E' toward F' immediately throws the armature-circuit of the motor I into parallel with the armature-circuit of the motor II through the brushes O and P and through the brushes R and S. As the motion of the controller is continued both motor-fields are weakened and the speed consequently increased by reason of the added resistances of segments $n^3$ coming into the field $i$ and the resistances of segments $q'$ coming into the field $h$. Finally when station F' is reached the field strength of both motors has been reduced to zero.

It is not essential that there be only two motors nor that they have a common armature-shaft nor that the machines be of the same size. As shown in Fig. 4, there may be two separate motors 15 and 16, having separate shafts 17 and 18, respectively. In this instance pulley 19 on shaft 17 is connected to pulley 20 on shaft 18 by means of the belt 21. In order that when only one machine is needed the other may stand still, the clutch 22 is mounted on shaft 18 and operated by the lever 23. The parts are so arranged that in one shifted position of said lever shaft 18 and pulley 20 will rotate together, and in the other shifted position of said lever one of the two members 18 and 20 may rotate while the other remains still, as will be readily understood by those skilled in the art.

What I claim as new, and desire to secure by Letters Patent, is—

1. A plurality of electric motors mechanically connected to rotate at the same relative speed, the armatures of said motors being connected in series and the fields in parallel with the source of electromotive force; and means for controlling the field strength of all of said motors independently of each other.

2. The combination of two electric motors, a shaft whereon all of the motor-armatures are mounted, means for connecting the armatures of said motors in series and the fields in parallel with the source of electromotive force; means for reducing the field strength of one of said motors to zero, and means for subsequently cutting out of circuit the armature of the dead machine.

3. The combination of two electric motors, a shaft whereon all of the motor-armatures are mounted, means for connecting the armatures of said motors in series and the fields in parallel with the source of electromotive force; means for reducing the field strength of one of said motors to zero, and means for mechanically disconnecting said motors.

4. The combination of two electric motors, a shaft whereon all of the motor-armatures are mounted, means for connecting the armatures of said motors in series and the fields in parallel with the source of electromotive force; means for reducing the field strength of one of said motors to zero, means for subsequently cutting out of circuit the armature of the dead machine, and means for mechanically disconnecting said motors.

5. The combination of two electric motors, a shaft whereon all of the motor-armatures are mounted, means for connecting the armatures of said motors in series and the fields in parallel with the source of electromotive force, and means for independently throwing the armature of the dead machine either into series connection with the other machine, or individually into circuit with the main line.

6. A plurality of electric motors mechanically connected to rotate at the same relative speed, means whereby the field-circuits of each motor may be thrown into or out of connection with the source of electromotive force, and other means whereby the armatures of each of said motors may be independently thrown into or out of separate connection with the source of electromotive force, or all of said armature-circuits may be thrown into series with the source of electromotive force.

7. A plurality of electric motors mechanically connected to rotate at the same relative speed, means for connecting the armatures in series with the source of electromotive force, means for connecting the fields in parallel with the source of electromotive force, means for controlling the field strength of one of said motors and other means for connecting said armatures in parallel with the source of electromotive force after the field strength of one of said motors has been reduced to zero.

8. A plurality of electric motors mechanically connected to rotate at the same relative speed, means for connecting the armatures in series with the source of electromotive force, means for connecting the fields in parallel with the source of electromotive force, means for controlling the field strength of said motors independently of each other and other means of connecting said armatures in parallel with the source of electromotive force after the field strength of one of said motors has been reduced to zero.

9. In combination with electric motors mechanically connected to rotate at the same relative speed, a controller having segments $n$ and $n'$ adapted to be connected by means of a brush N; segments $p$ and $p'$ adapted to be connected by means of a brush P; a segment $q$ adapted to be connected to segment $n$ by a brush Q; connections from the segments $n$ and $p'$ to opposite terminals of a source of electromotive force; connections from one motor-field separately to segments $n'$ and $p$; connections from the other motor-field separately to segments $q$ and $p$; and means for connecting the armatures in series with the source of electromotive force.

10. The combination of electric motors mechanically connected to rotate at the same relative speed, and a controller having a segment $n$ and a set of resistance-segments $n^2$, a brush N for connecting segments $n^2$ to segment $n$ to vary the interposed resistance, segments $p$ and $p'$ adapted to be connected by means of a brush P; a segment $q$ adapted to be connected by a brush Q to segment $n$; connection from the segments $n$ and $p'$ to opposite terminals of a source of electromotive force; connections from one motor-field separately to segments $n'$ and $p$; connections from the other motor-field separately to segments $q$ and $p$; and means for connecting the armatures in series with the source of electromotive force.

11. The combination of electric motors mechanically connected to rotate at the same relative speed, means for connecting the field-circuits in parallel to the source of electromotive force, means, including a controller-arm and segments, for controllably throwing resistance into one of the field-circuits, a brush O, segments $o'$ and $o^2$, adapted to be connected through said brush to one armature-circuit for all active positions of the controller-arm; segments $r$ and $r'$ and a brush R for connecting the armature-circuits in series at one position of the controller-arm; and segments $s^2$ and $p'$ and brush S for connecting the second armature separately in circuit at another position of said controller-arm, the said armatures being thereby in series in one position of the controller-arm, and in parallel in another position of said controller-arm.

ARTHUR P. WARNER.

Witnesses:
 JULIA M. BRISTOL,
 HOWARD M. COX.